United States Patent [19]

Stelter

[11] 3,754,221

[45] Aug. 21, 1973

[54] GROUND FAULT DETECTOR AND METHOD OF GROUND FAULT DETECTION

[76] Inventor: Manfred Karl Georg Stelter, 3 Howard Dr., Willowdale, Ontario, Canada

[22] Filed: Apr. 19, 1971

[21] Appl. No.: 135,334

[30] Foreign Application Priority Data
Dec. 22, 1970 Canada .............................. 101231

[52] U.S. Cl. .............................. 340/255, 317/18 D
[51] Int. Cl. .......................................... G08b 21/00
[58] Field of Search .................. 340/255; 317/18 D; 307/94

[56] References Cited
UNITED STATES PATENTS
3,066,284   11/1962   McKinley et al. .................. 340/255

Primary Examiner—John W. Caldwell
Assistant Examiner—Daniel Myer
Attorney—George A. Rolston

[57] ABSTRACT

A ground fault detector for detecting both balanced and unbalanced faults, eg. leakages to ground or other faults in a floating direct current system, comprises, first and second resistances connectible respectively to the positive and negative buses of the system, a two-way switching device operable to connect to the first and to the second resistances alternately, a fault condition being detected by voltage level detecting means connected between the switching device and ground, and a method of detecting ground faults in such a system by continuously alternately checking positive and negative sides of such system against predetermined known reference resistances.

12 Claims, 9 Drawing Figures

INVENTOR.
MANFRED K. G. STELTER

BY:

*George A. Rolston*
ATTORNEY

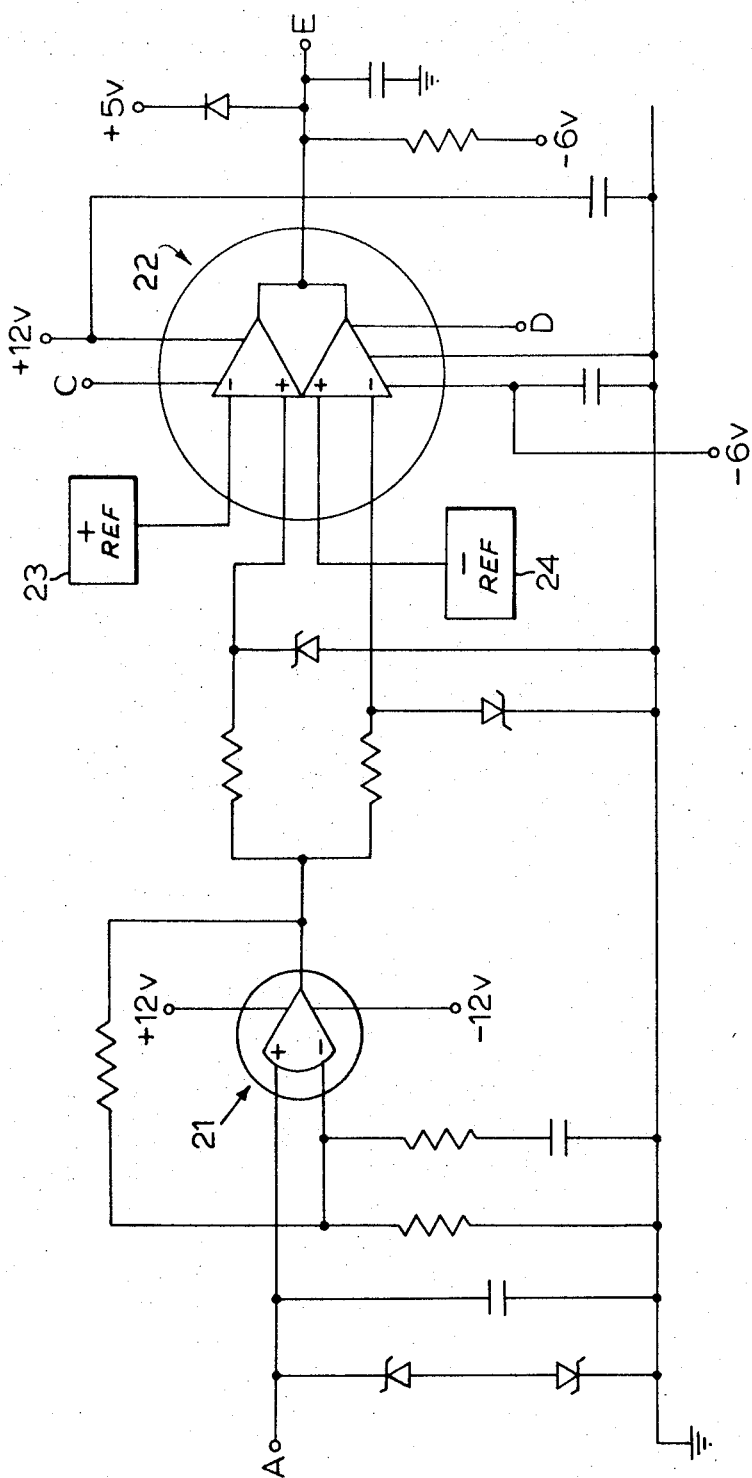

SENSE CONTROL CIRCUIT

OSCILLATOR CIRCUIT

INVENTOR.
MANFRED K.G. STELTER

BY:

*George A. Rolston*

ATTORNEY

GROUND FAULT DETECTOR AND METHOD OF GROUND FAULT DETECTION

This invention relates to a ground fault detector for floating, i.e. ungrounded, direct current electrical systems, and a method of ground fault detection.

The invention is more particularly concerned with a ground fault detector for use in association with protective electrical equipment such as is used in power generating stations, which is energized from a floating battery providing positive and negative terminals, commonly known as a station battery.

BACKGROUND OF THE INVENTION

Protective electrical equipment, such as is commonly employed in power generating stations and the like, is, according to well established techniques, connected by means of a suitable electrical supply system, including positive and negative buses, to a so-called floating station battery providing a power supply, independent from the power generated by the station itself, although obviously being continuously re-charged while the station is in operation. In the event of any failure in the power generating station itself, the protective electrical equipment will inactivate or isolate any such portion of the station, so as to minimize further damage. Obviously, however, any inadvertent malfunction of such protective equipment will cause serious interruption in the operation of the station, and must be eliminated. Of even greater importance, is the possibility that in some cases, malfunction of the protective equipment may even result in serious damage to the station equipment. One of the commonest causes of malfunction in such protective equipment is the development of leakages, usually due to faulty insulation, present in the electrical system connecting the station battery to the protective equipment. Where a single isolated fault occurs in one side of the circuit, the result is not too serious. However, where faults occur in both positive and negative sides of the circuit, leakages through ground will result in current flowing through the system, which can cause equipment malfunction. Accordingly, it is of the utmost importance that the presence of such faults be detected when they occur, and in any event prior to any equipment malfunction. The detection of a single isolated fault, or faults in one side only of the system is not too difficult. However, where faults occur in both sides of the system, and particularly where such faults are more or less equally balanced then the problem of detection of such faults becomes very much greater.

Ground fault detectors, for use in association with such a system have, in the past, usually included a pair of resistances connected in series across the battery terminals, or the buses, the mid-point of the resistances being connected to ground through a current responsive device. When one side of the battery is effectively grounded through a leakage resistance path, current will flow through the current responsive device. The current responsive device may be preset so as to respond only to currents greater than a certain value corresponding to the minimum permissible leakage resistance. Such a ground detector suffers from the disadvantage, which is serious in certain situations, that it is quite insensitive to balanced faults caused by similar leakage paths in both sides of the system. A further disadvantage of such known types of fault detectors is that their response characteristics, being dependent upon the values of the series-connected resistances, which must not conflict with leakage considerations are usually such as to leave a wide range of fault conditions for which no response can be obtained and a wide range of acceptable or insignificant fault conditions for which an unwanted response will be obtained.

BRIEF SUMMARY OF THE INVENTION

According to the present invention, a ground fault detector for detecting balanced or unbalanced faults in a floating direct current electrical system comprises first and second resistance means connectible respectively to positive and negative sides of said system, voltage detection means connected to ground, a two-way switch connected between said voltage detection means and each of said first and second resistance means, and means for operating the two-way switch to connect the first and second resistance means alternately in series with the voltage detection means.

An important characteristic of the fault detector is that since only one of the first and second resistance means is connected to the two-way switch at any one time, the sensitivity of the detector is not dependent upon whether the fault condition is balanced or unbalanced.

According to a further feature, the values of the first and second resistance means may be varied independently, so as to vary the response characteristics of the detector with respect to fault conditions at the positive and negative terminals.

In order to avoid unwanted responses due to transients that might occur, the voltage detection means may be rendered unresponsive to fault pulses for a predetermined duration following each change-over of the two-way switch.

The present invention also provides a method of detecting ground faults in a floating direct current electrical system and comprising the steps of connecting first and second resistance means to respective positive and negative sides of said distribution system, alternately connecting said first and second resistance means to ground, to establish a fault signal, and detecting said fault signal at a predetermined time delay after such connection, so as to eliminate false fault alarms due to transient signals.

The apparatus and method according to the present invention will now be described by way of example only, with reference to the accompanying drawings in which:

BRIEF DESCRIPTION OF THE DRAWINGS

FIG. 3 is a wiring diagram of the Voltage Level Detector of FIG. 1;

Figure 1:
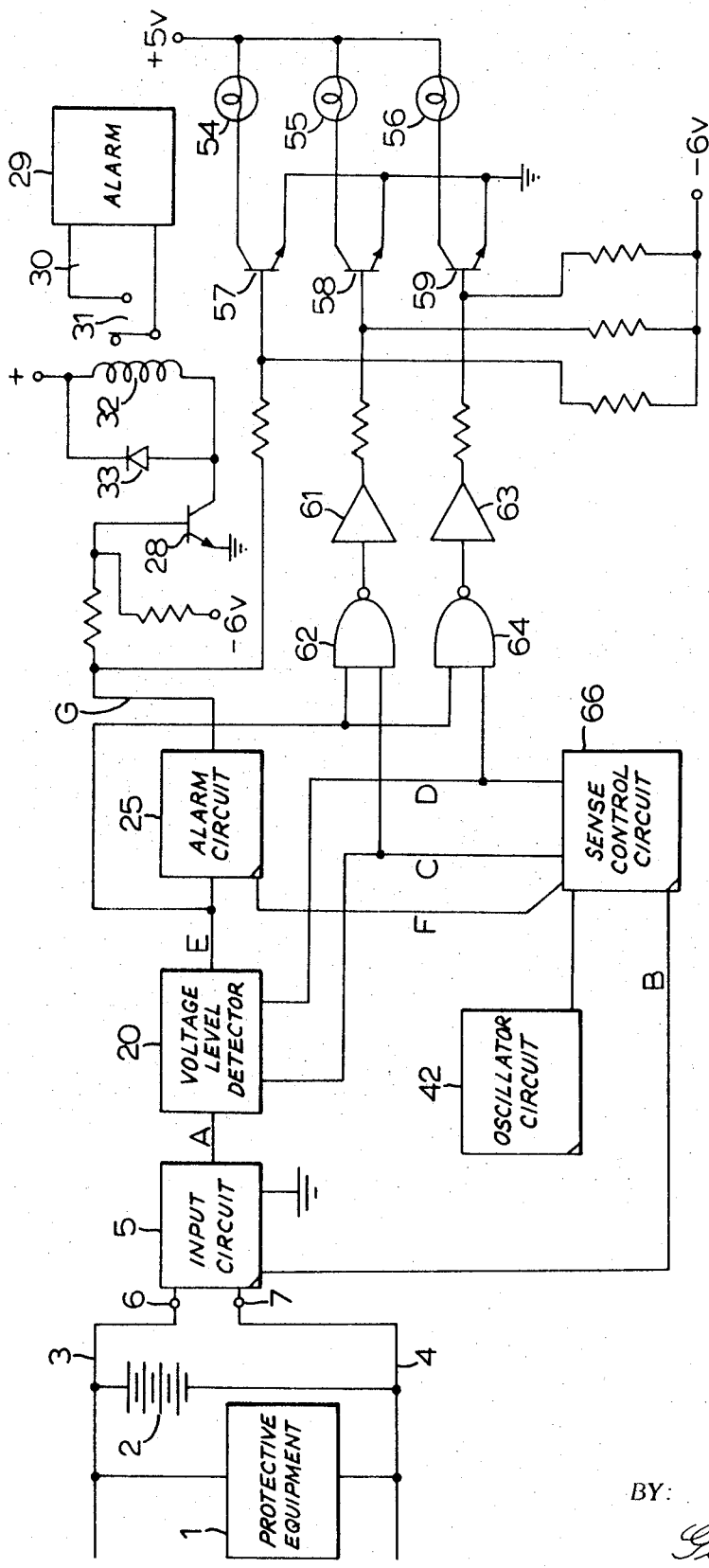
FIG. 1 is a general circuit diagram of the fault detector, certain components being shown in block form.
Figure 2:
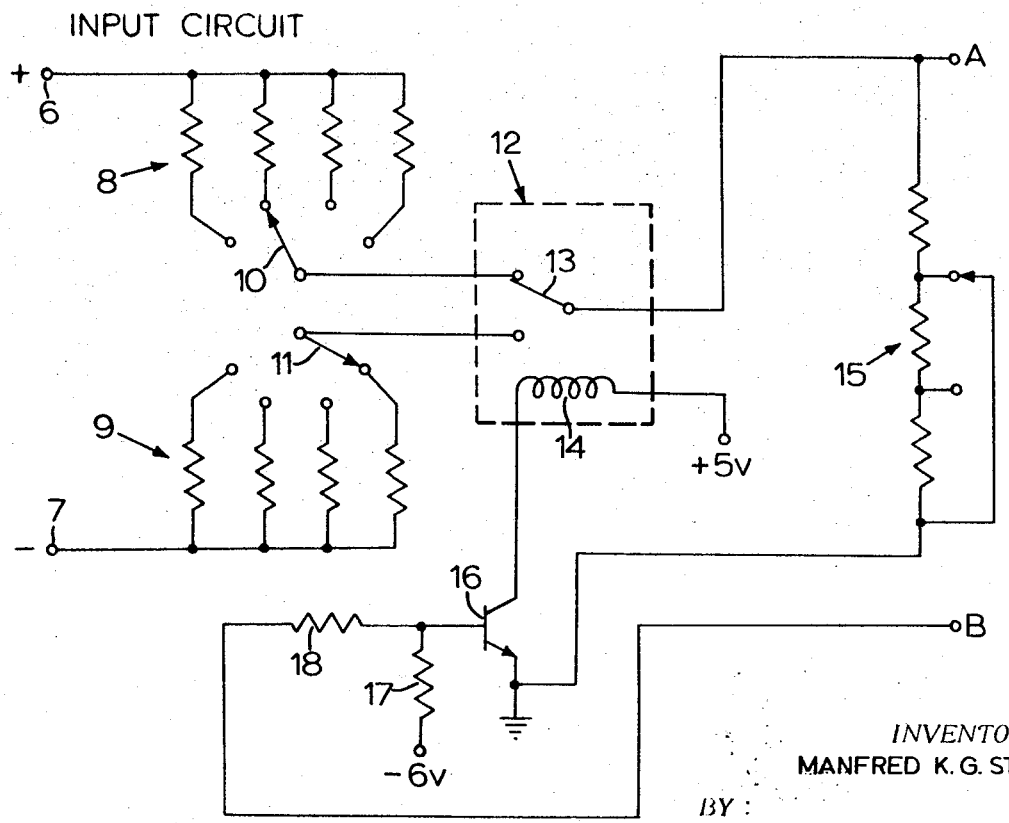
FIG. 2 is a wiring diagram of the Input Circuit of FIG. 1.

The letters A, B, C, D, E, F, G and H serve to indicate how the different components are interconnected, the connection A in FIG. 1, for example, representing a connection between point A in FIG. 2 and point A in FIG. 3.

The ground fault detector is intended to be used for detecting balanced and unbalanced faults in a floating electrical system, which is indicated in FIG. 1 as comprising protective equipment 1 energized from a floating battery 2 and connected to the battery by terminal buses 3, 4. The input circuit 5 of the ground fault detector has a pair of input terminals 6 and 7 for connection to the terminal buses 3 and 4. As indicated in FIG. 2, the input circuit includes first and second resistance means 8, 9, each comprising four separate resistors connected to a respective input terminal 6, 7, and a selector switch 10, 11 for each resistance means to select any desired resistor. The two resistance means 8, 9 are identical, but the individual resistors thereof differ in value so that the selector switches 10 and 11 provide means for independently varying the resistance values of the resistance means 8 and 9.

The selected resistor of each said resistance means 8 and 9 is connected through its selector switch 10, 11 to a respective pole of a two-way switch 12 having a moving contact 13 and an energizing coil 24 for moving the contact 13 alternately between its two positions. The two-way switch 12 is operable to connect the first and second resistance means 8 and 9 alternately in series with detection means comprising, in this embodiment, the third resistance means 15 connected between the moving contact 13 and ground fault sensing circuit 20 (described below). The resistance means 15 is preferably constructed as a potential divider with means for selecting different tappings so as to vary the resistance value in accordance with any ground fault condition to be detected, a fault signal, ie. a voltage appears at the connection point A, the polarity of the signal depending upon whether the ground fault is detected at the positive or negative input terminal and the duration of the signal being determined by the time of dwell of the moving contact 13.

The fault signal appears across the resistance means 15 by virtue of a circuit being completed through the resistance means 15, the switch contact 13, the respective resistance means 8 or 9, the respective bus in which the fault condition occurs, and the leakage path to ground.

The energizing coil 14 of the switch 12 is connected between a +5 volt source and ground through a driving transistor 16, the input circuit to the base of the driving transistor comprising a resistor 17 connected to a −6 volt source and a series resistor 18 connected to the point B, to which control pulses are applied as hereinafter described.

The fault signals or voltages at point A are applied to the input of the ground fault sensing circuit 20, details of which are shown in FIG. 3. The ground fault sensing circuit 20 is in effect a voltage level detector including means for deriving trigger pulses in accordance with the input voltage pulses exceeding a predetermine reference level.

Figure 4:
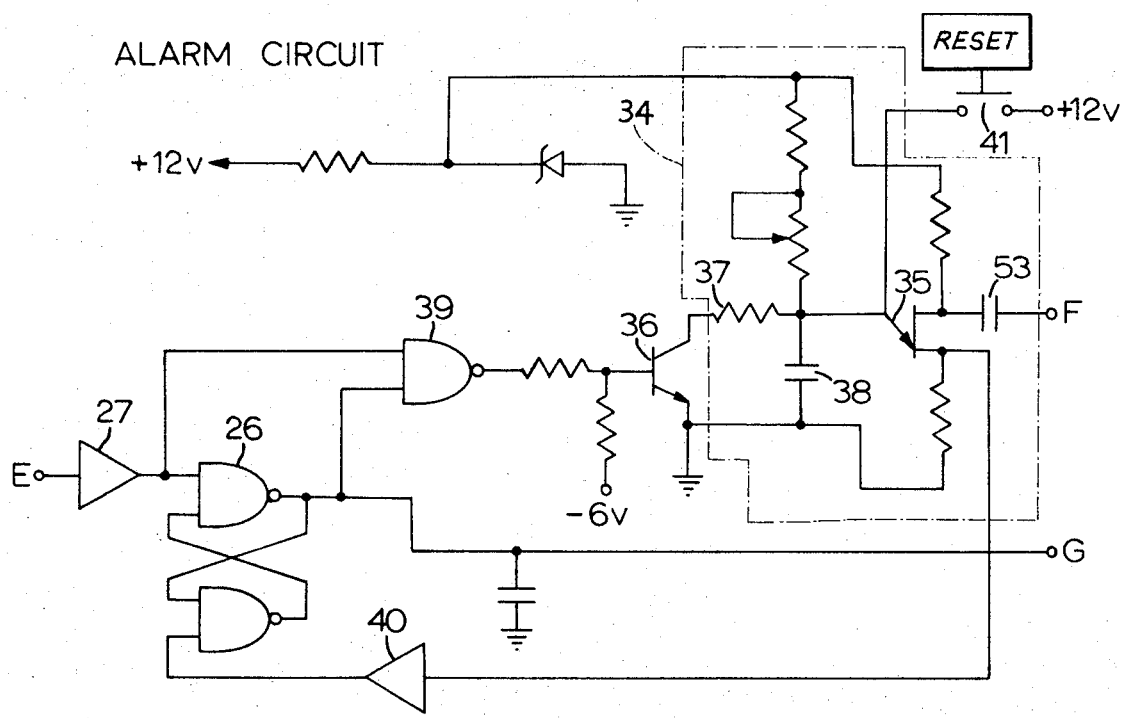
FIG. 4 is a wiring diagram of the Alarm Circuit of FIG. 1.

The circuit comprises a low gain, non-inverting operational amplifier 21, and an operational amplifier 22 which compares the positive or negative fault signals with reference levels or voltages derived from respective sources 23, 24, the trigger pulses appearing at point E if the input voltage signals exceed the reference level of the appropriate polarity. The operational amplifier 22 may be a dual comparator Type 711 manufactured by Fairchild Semiconductor, a division of Fairchild Camera and Instruments Corporation. The reference sources 23 and 24 are preferably adjustable automatically with the selection of the resistors of the resistance means 8 and 9, so that the reference levels are attenuated in accordance with any attenuation of the incoming signals dependent on such selection. The trigger pulses are applied to an alarm circuit 25, details of which are shown in FIG. 4.

The alarm circuit includes an electronic switch in the form of a flip flop 26, to which the trigger pulses are applied by an inverter 27. The flip flop 26 controls the output voltage at point G. The alarm 29, (FIG. 1) has an energizing circuit 30 including a relay switch 31, the energizing coil 32 of which is energized by a driving transistor 28, the base of the transistor being connected to the point of connection G, so that when the point G is at a high potential the coil 32 is energized to close the switch contact 31 and so actuate the alarm 29. A rectifier 33 is connected across the coil 32. The flip flop 26 is arranged to be reset by a resetting circuit 34 including a unijunction transistor 35, the emitter circuit of which includes a timing circuit constituted by a transistor 36, a resistor 37 and a capacitor 38. The timing circuit is controlled by a NAND gate 39 connected to the flip flop 26, and is arranged so that when the flip flop 26 is set by an incoming trigger pulse, due to a ground fault to be detected, the capacitor 38 commences to charge up and a resetting pulse is applied to the flip flop from the unijunction 35 via an inverter 40, when the voltage across the capacitor 38 has reached a predetermined level. If an incoming fault signal arrives before the flip flop is reset, the capacitor 38 is discharged and therefore resetting is prevented for another charging period. The time constant of the timing circuit is at least as long as the cycle of operation of the two-way switch 13 so that the flip flop 26 will remain in the set condition so long as a fault condition persists. A push button switch 41 is provided for manual resetting.

Figure 6:
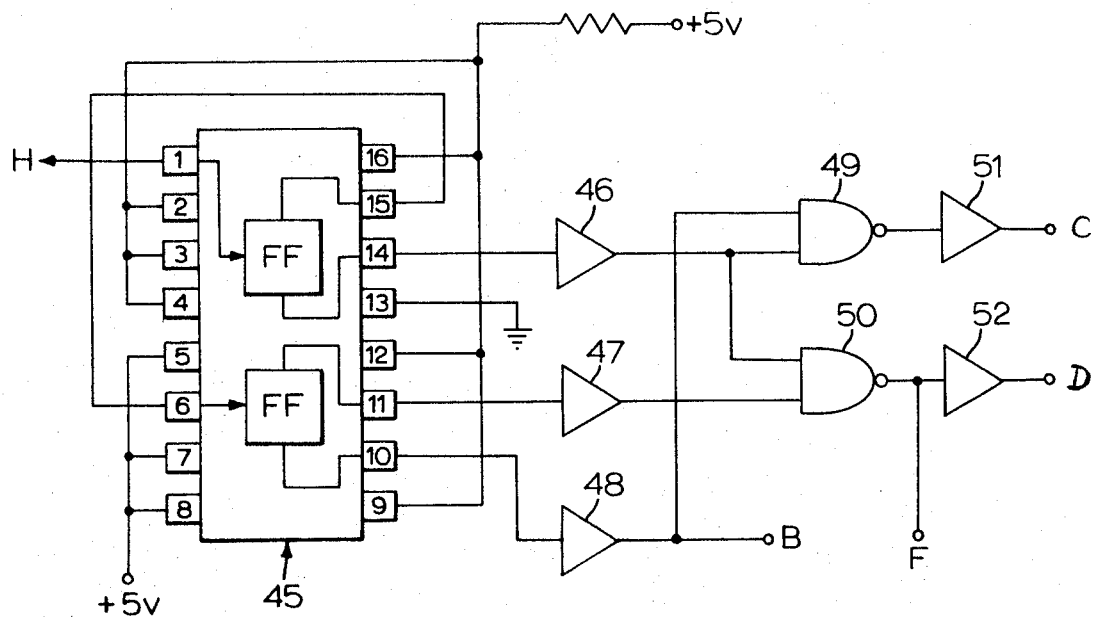
FIG. 6 is wiring diagram of the Sense Control Circuit of FIG. 1.
Figure 5:
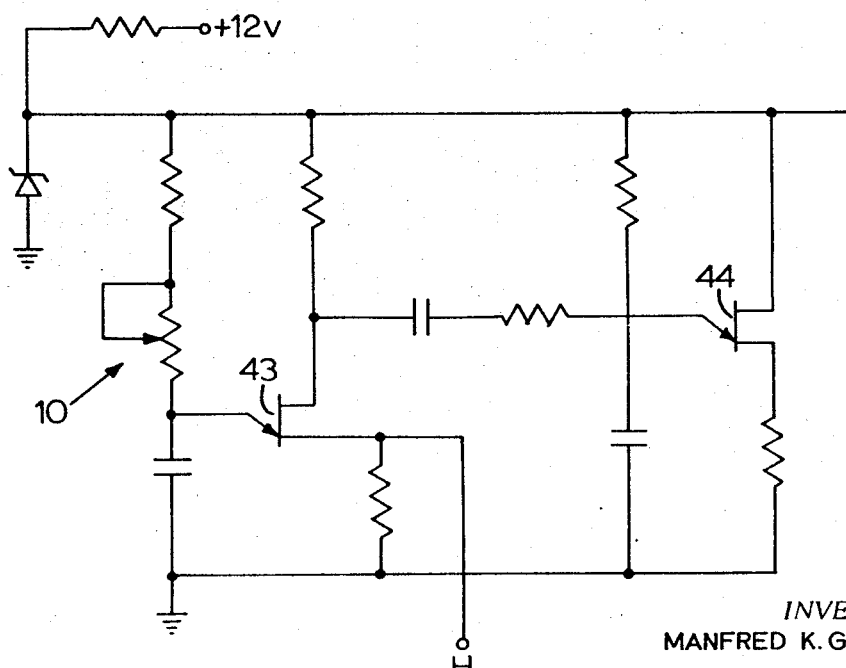
FIG. 5 is a wiring diagram of the Oscillator Circuit of FIG. 1.

The cyclic operation of the two-way switch 13 is controlled by means of an oscillator circuit 42, details of which are shown in FIG. 5, the oscillator circuit comprising a pair of unijunction transistors 43, 44. Output pulses from the oscillator circuit are applied to a sense control circuit via connection H, the details of the control circuit being shown in FIG. 6. This circuit comprises a dual J–K master-slave flip flop (Texas Instruments Co., Device SN7476N) indicated schematically at 45, the outputs of which are taken through three inverters 46, 47, 48 to a pair of NAND gates 49, 50 and thence to points C and D via inverters 51, 52. The potentials at points C and D are applied to respective control terminals of the operational amplifier 22 (FIG. 3) for the purpose of gating incoming fault signals of the respective polarities. From point B (FIG. 6) a sequence of pulses is derived which is applied to the input circuit of transistor 16 (FIG. 2) for the purpose of controlling the operation of the two-way switch 12. The point F is connected for the purpose of synchronisation to base 2 of the unijunction transistor 35 (FIG. 4) through a capacitor 53.

The frequency of the oscillator circuit 42 can be varied by adjusting the oscillator timing circuit, the constants of which predetermine the oscillator frequency. The oscillator output is a train of spike pulses at the predetermined frequency, and the master-slave flip flop is toggled in known manner by the spike pulses to provide at terminal 14 a square wave output at the prdetermined frequency of the oscillator, and to provide at terminals 10 and 11 square wave outputs at half the oscillator frequency, these outputs being in antiphase. Since the two-way switch 12 is operated at the frequency of the pulses at point B, and since the control pulses at points C and D are derived by gating the outputs from terminals 10, 11 and 14 in the manner shown, it will be seen that the operational amplifier 22 is rendered responsive to positive and negative fault signal alternately in accordance with the occurrence of the control pulses, but remains unresponsive to fault signals for a predetermined duration immediately following each change-over of the two-way switch 12.

Referring again to FIG. 1, three fault indicating lamps 54, 55 and 56, are provided for indicating respectively the occurrence of any ground fault, and the specific occurrence of ground faults in the positive and negative buses. The indicator lamps 54, 55, 56 are energized through driving transistors 57, 58, 59, the base potentials of which are controlled by pulses from the alarm circuit 25. The base of transistor 57 is connected to point G and is fired whenever a fault condition exists, that is to say whenever the flip flop 26 is set. The base of transistor 58 is connected through an inverter 61 to a NAND gate 62, the inputs of which are connected to connection points C and E, so that the transistor is fired only when a fault condition occurs on the positive bus. In a similar way, the base of transistor 59 is connected through an inverter 63 to a NAND gate 64, the inputs of which are connected to points D and E so that the transistor is only fired when a fault condition occurs on the negative bus.

Considering the drawings in combination, there is illustrated a ground fault detector for detecting balanced and unbalanced faults in a floating electrical system 1, 2, providing positive and negative terminal buses 3, 4, the ground fault detector comprising:

i. first and second adjustable resistance means 8, 9, connectible respectively to positive and negative buses;

ii. an adjustable third resistance means 15 connected to ground;

iii. a two-way electromagnetic switch 12, 13, 14 connected between the resistance means 15 and each of the resistance means 8 and 9;

iv. an oscillator circuit 42 and control circuit 66 for operating the electromagnetic switch at a predetermined frequency to connect the resistance means 8 and 9 alternately in series with the resistance means 15 whereby to derive a train of fault signals at the predetermined frequency in accordance with a continuing fault condition on either of the terminal buses;

v. a voltage level detector 20 connected across the resistance means 15, the voltage level detector including an input amplifier 21 and an operational amplifier 22 for detecting the polarity and amplitude of the fault signals and for deriving trigger pulses if the fault signals of either polarity exceed a predetermined voltage level determined by the reference sources 23 and 24;

vi. a device 45 operable in synchronism with the electromagnetic switch for rendering the operational amplifier 22 responsive to fault signal only after a predetermined duration following each change-over of the electromagnetic switch;

vii. an alarm circuit 29, 30 which is energized by an electromagnetic switch 31, 32 in accordance with the condition of the voltage level detector;

viii. alarm indicating means 54, 55, 56 having respective energizing circuits 57, 58 and 59 responsive to the condition of the voltage level detector;

ix. an electronic switch 26 responsive to the trigger pulses from the voltage level detector and connected to the energizing circuit 57 of the first indicator;

x. a sense control circuit 66 for deriving a train of alternating first and second control pulses coincident with the respective alternate positions of the two-way switch 12;

xi. and first and second gating means 62, 64 for gating the trigger pulses with the first and second pulses of the train respectively, the second and third energizing circuits 58 and 59 being connected to the gating means 62, 64 and being actuated in accordance with the gating of the trigger pulses whereby each of the alarm indicators 55 and 56 is responsive to a respective fault condition.

It will, however, of course, be understood, that the apparatus described is considered as exemplary only, and many variations or substitutions will occur to persons skilled in the art, for the purposes of achieving essentially the same result, without departing from the scope of the invention.

Figure 8:
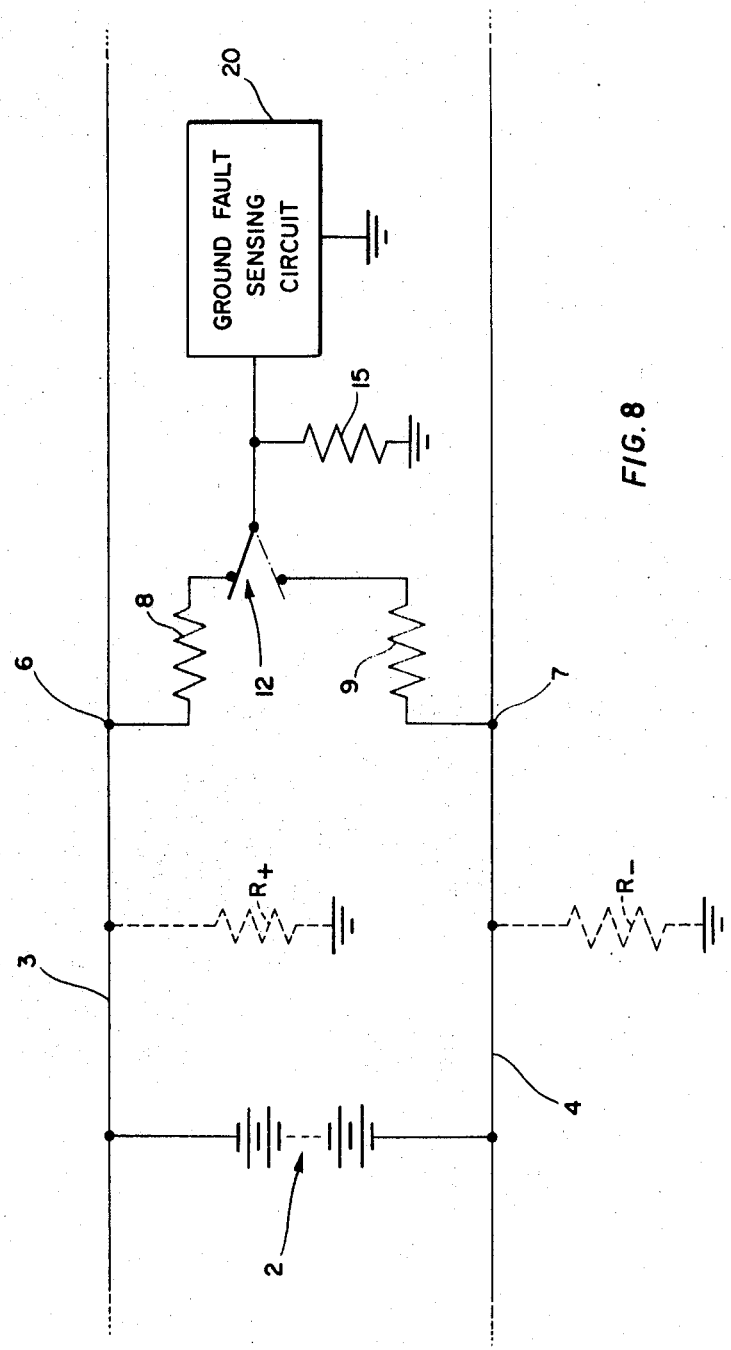
FIG. 8 is a schematic diagram showing a typical floating station battery, and distribution buses, and faults in such buses, with the ground detector according to the present invention shown connected therewith, said ground detector being shown in greatly simplified form for the sake of clarity.

Referring now to FIG. 8, the operation of the invention is now described in its simplest terms. As is shown in FIG. 8, the station battery 2, supplying the buses 3 and 4, is in fact passing current continually through to leakage paths or faults shown in phantom form as R+ and R−. The fault detector according to the invention is shown as connected as at points 6 and 7 to the buses 3 and 4, as in the case of the embodiment of FIG. 1, and the resistances 8 and 9 are alternately connected by means of the switch 12, through the voltage detector shown generally as 20 to ground.

Since the nominal voltage of the battery 2 is known, and the value of the resistances 8 and 9 is known, the voltage which will be detected at the detector 20, in the absence of any faults such as R+ and R−, can readily be calculated. Preferably, according to the invention, the resistances 8 and 9 have sufficiently high values, that, in the absence of any significant faults R+ and R−, the voltage detected in the detector 20 will still be sufficiently low that no alarm signal will be generated.

However, when the switch 12 is connected with the resistance 8, and when a fault such as R− is present, in the other bus 4, i.e., the bus to which the switch 12 is not connected, then a current will flow from the station battery, through the bus 3, through the resistance 8 and switch 12, through the voltage detector, through ground and back through resistance R−. If resistance R− has a relatively low value, then a significant current flow will take place, and the voltage detected at the voltage detector 20 will be increased to a value above the predetermined reference value, and as a result, an alarm signal will be created.

Similarly, when the switch 12 is connected to the resistance 9, and where a fault such as R+ exists in the opposite bus 3, then again, a current will flow, and the voltage detected will rise, and provided it rises above the predetermined reference level, then an alarm signal will be created.

Thus, it will be seen that according to the practice of the invention, the method of the invention in its broadest scope comprises the location of a fault in one side of a circuit, by connecting a resistance of known value to the opposite side of the circuit, and grounding such resistance through a voltage detector, and determining the voltage drop. More specifically, the method according to the invention will comprise the steps of repeating these steps alternately for opposite sides of the circuit, thereby providing a measurement of faults present in both sides of the circuit.

It will, of course, be understood, however, that repeatedly switching switch 12 to and fro, at least in the presence of any detectable fault such as R+ and R— will result in the occurrence of transient voltages in the buses 3 and 4, which will be at a peak value more or less instantaneously on the connection of the switch 12 with either one of resistances 8 or 9, and which will then diminish rapidly. However, it will also be understood that according to well known principles, such transient voltages may exceed the actual voltage which can be detected in the voltage detector. Such greatly increased transient voltages will then show up in the voltage detector as apparent faults, resulting in the occurrence of an alarm signal in circumstances where, in fact, there may be no fault, or at least no significant fault such as should give rise to an alarm signal. Accordingly, by the practice of the method according to the invention, the operation of the voltage detector is subjected to a predetermined time delay after the closing of the switch 12 with either of resistances 8 or 9, so that during the brief transient voltages, the voltage detector is out of operation, and does not in fact, commence operation until the voltage has stabilized.

In the great majority of cases, the ground detector according to the invention will be required to operate automatically for very extended periods of time, and the method according to the invention will be carried out automatically by some such means as that described above. However, it will of course be equally apparent that the operation of the method according to the invention is not confined to any of these specific circuits or systems described, but may, for example, be carried out manually, or by means of other circuits achieving essentially similar results.

By way of example of the operation of the invention, formulae and numerical examples are now given showing typical situations in which the method according to the invention will be effective to detect balanced faults. For the purposes of these calculations, the following symbols will be used and the following formulae are applicable:

$R_+$ positive bus fault
$R_-$ negative bus fault
$r$ value of resistance 8 or 9
$\beta$ combined value of resistance 8 or 9 and respective positive or negative bus fault
$E$ is voltage of battery 2
$V$ is voltage detected at 20

Calculation to determine value of $\beta$ is as follows:

$$\beta_+ = [(R_+) r/R_+ + r]$$

Calculation to determine V is as follows:

$$V = (\beta_+/R_- + \beta_+) \times E$$

The following values may be given for a typical case:
$r = 100$ k ohms
$E = 250$ volts and an alarm is required whenever a fault is located having a resistance less than 200 k ohms. When calculated according to the foregoing formulae, the voltage V detected in the presence of a single fault of 200 k ohms will be 83.3 volts. Accordingly, the device is set so as to give an alarm when the voltage of the fault signal rises to, or above, 83.3 volts.

However, in the presence of balanced faults of 200 k ohms or even as low as 150 k ohms the voltage detected will not rise above 83.3 volts due to the presence of faults on both buses and accordingly, the sensitivity of the device will be somewhat reduced, although it will still be greater than that of earlier devices. The following table shows the values of V calculated for various values of $R_+$ and $R_-$.

TABLE OF VALUES

|  | $R_+$ | $R_-$ | $V_+$ | $V_-$ |  |
|---|---|---|---|---|---|
| unbalanced fault | infinite | 200k | 83.3v | 0v | alarm one side |
| balanced faults | 100k | 100k | 83.3v | −83.3v | alarm both sides |
| balanced faults | 50k | 50k | 100v | −100v | alarm both sides |
| unbalanced faults | 200k | 100k | 100v | −50v | alarm one side |
| balanced faults | 150k | 150k | 71.5v | −71.5v | no alarm |

Note that in the case of balanced faults of 50k ohm and 100k ohm alarm signals will be given. However, in the case of balanced faults of 150k ohm, no alarm signal will be given. However, as shown in FIGS. 7a and 7b, this degree of sensitivity is still much greater than that of earlier devices.

Figure 7A:
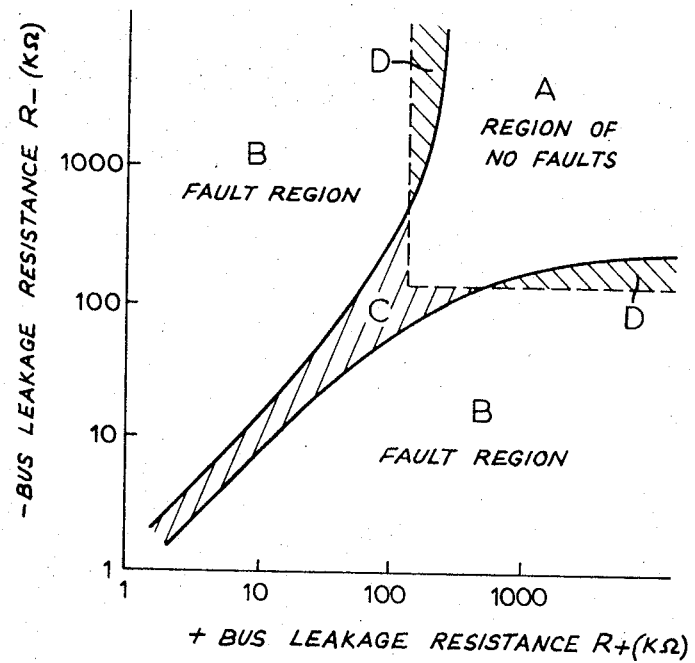
FIGS. 7a and 7b are diagrams showing typical response characteristics of a known type of ground fault detector and a fault detector in accordance with the invention, respectively.

The degree of approximation achieved by the known design is demonstrated by the solid lines in FIG. 7A. The alarm areas are marked B and D and the no alarm areas are marked A and C. Since the desired alarm area is defined by the dotted line, then areas C and D should be minimized. Area C represents balanced faults. Area D represents the false alarms.

Figure 7B:
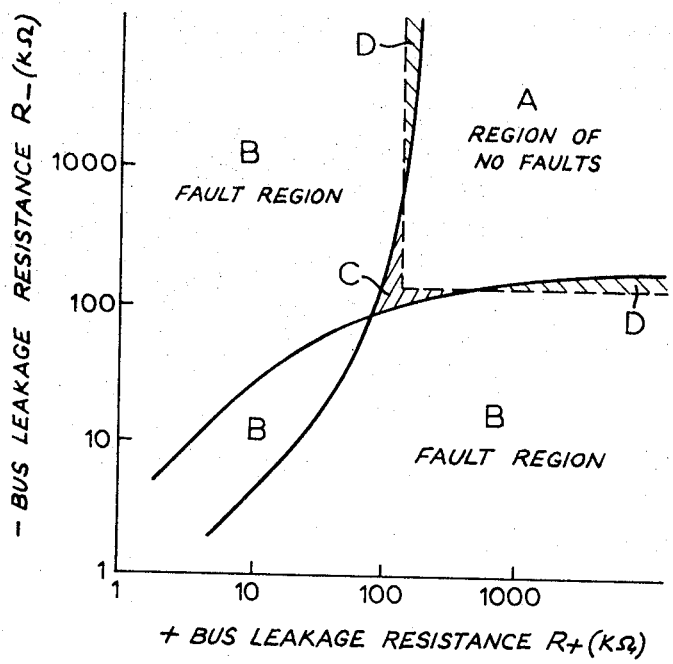

The characteristics of the new present fault detector are shown in FIG. 7b. Areas C and D are greatly reduced and the balanced fault problem is solved.

The foregoing is a description of a preferred embodiment of the invention which is given here by way of example only. The invention is not to be taken as limited to any of the specific features as described, but comprehends all such variations thereof as come within the scope of the appended claims.

What I claim is:

1. A ground fault detector for detecting balanced and unbalanced faults in a floating electrical system having positive and negative sides and comprising:
   first and second resistance means connectible respectively to positive and negative sides of said system;

two-way switching means connectible with each of said first and second resistance means;

fault signal detection means connected between said switching means and ground;

means for operating the two-way switching means to connect said first and second resistance means alternately in series with ground, and, gate means controlling said fault signal detection means and maintaining same normally insensitive and rendering same sensitive to fault signals after a predetermined delay following operation of said two-way switching means whereby to avoid sensing of transient fault signals by said fault signal detection means during said predetermined delay.

2. A ground fault indicator as claimed in claim 1, including means for independently varying the resistance values of said first and second resistance means whereby to vary the response characteristics of the ground fault detector.

3. A ground fault detector as claimed in claim 1 wherein said fault signal detection means includes third resistance means connected between said switching means and ground; and a voltage level detector connected across the third resistance means, the voltage level detector being adapted to detect fault signals exceeding a predetermined voltage level.

4. A ground fault detector as claimed in claim 3 including means operable in synchronism with said switch operating means for rendering the voltage level detector unresponsive to fault signals for a predetermined duration following each change-over of the two-way switch; and alarm means responsive to the condition of the voltage lever detector and operable in accordance with the detection of fault signals by the voltage level detector.

5. A ground fault detector for detecting balanced and unbalanced faults in a floating electrical system having positive and negative sides, comprising:

first and second resistance means connectible respectivey to said positive and negative sides of said system;

third resistance means connected to ground;

a two-way switch connectible between said third resistance means and each of said first and second resistance means;

means for operating the two-way switch at a predetermined frequency to connect said first and second resistance means alternately in series with the third resistance means whereby to derive a train of fault signals in accordance with a continuing fault condition;

a voltage level detector connected across the third resistance means, the voltage level detector including means for detecting the polarity exceeding a respective predetermined voltage level;

gate means operable in synchronism with said switch operating means for rendering the voltage level detector unresponsive to fault signals for a predetermined duration following each change-over of the two-way switch and rendering the same sensitive to fault signals after said predetermined delay; and alarm means connected to the voltage level detector and operable in accordance with the occurrence of said trigger pulses.

6. A ground fault detector as claimed in claim 5 wherein the alarm means includes an alarm indicator and an energizing circuit therefor, said energizing circuit being connected to an electronic switch responsive to said trigger pulses and operable to actuate the energizing circuit in response to a fault condition.

7. A ground fault detector as claimed in claim 6, the electronic switch having a set condition and a reset condition, and including means for resetting the electronic switch from its set condition, and timing means connected to the resetting means for delaying resetting of the switch for an interval corresponding to the cycle of operation of said two-way switch.

8. A ground fault detector for detecting balanced and unbalanced faults in a floating electrical system having positive and negative sides, comprising:

first and second resistance means connectible respectively to said positive and negative sides of said system;

third resistance means connected to ground;

a two-way switch connectable between said third resistance means and each of said first and second resistance means;

means for operating the two-way switch at a predetermined frequency to connect said first and second resistance means alternately in series with the third resistance means whereby to derive a train of fault signals in accordance with a continuing fault condition;

a voltage level detector connected across the third resistance means, the voltage level detector including means for detecting the polarity exceeding a respective predetermined voltage level;

means operable in synchronism with said switch operating means for rendering the voltage level detector unresponsive to fault signals for a predetermined duration following each changeover of the two-way switch;

a first alarm indicator and an energizing circuit therefor, said energizing circuit being connected to an electronic switch responsive to said trigger pulses and operable to actuate the energizing circuit in response to a fault condition;

second and third alarm indicators and respective energizing circuits therefor, the ground fault detector further including means for deriving first and second trains of control pulses coincident with the respective alternate positions of the two-way switch, and first and second gating means for gating the trigger pulses with the first and second trains of control pulses respectively, the energizing circuits of the second and third alarm indicators being connected to the first and second gating means and being actuated in accordance with the gating of the triggering pulses whereby each of the second and third alarm indicators is responsive to a respective fault condition.

9. A ground fault indicator as claimed in claim 8 including first and second gating means for gating the trigger pulses with the first and second control pulses respectively, and second and third energizing circuits being connected to the first and second gating means and being actuated in accordance with the gating of the trigger pulses whereby each of the second and third alarm indicators is responsive to a respective fault condition.

10. A ground fault detector as claimed in claim 5 including means for independently varying the resistance values of the first and second resistance means, first and second reference voltage sources for determining said respective voltage levels, and means coupled to said resistance varying means for independently adjusting the reference voltage sources to vary the respective voltage levels in accordance with the respective values of said first and second resistance means.

11. The method of detecting ground faults in an electrical system having a floating battery and positive and negative conductors connected thereto, and comprising the steps of:

connecting resistances of predetermined value to each of said conductors;

alternately connecting each of said resistances to ground whereby to complete an electrical circuit between one said conductor and the resistance connected thereto and a groundd fault present in the other said conductor, thereby to establish a fault signal and temporary transient signals;

temporarily blocking said signals to permit collapse of said transient signals resulting from said connection, and, detecting said fault signal a predetermined time after connection of a said resistance to ground and after collapse of said transient signals.

12. The method as claimed in claim 11, including the step of generating an alarm signal in response to a fault signal greater than a predetermined value.

* * * * *